United States Patent Office 2,928,873
Patented Mar. 15, 1960

2,928,873

CERTAIN MONOAMIDES OF HYDANTOIC ACID

Seymour L. Shapiro, Hastings on Hudson, and Louis Freedman, Bronxville, N.Y., assignors to U.S. Vitamin and Pharmaceutical Corporation, New York, N.Y., a corporation of Delaware No Drawing. Application January 7, 1959
Serial No. 785,330

6 Claims. (Cl. 260—553)

This invention is concerned with N-substituted hydantoamides and particularly with hydantoamides of the following formula

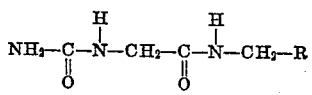

wherein R is an alkyl, cycloalkyl, aryl, and arylalkyl group having a carbon content of $C_4$-$C_7$.

6.85 g. (0.055 mole) of (2,5-endomethylene)cyclohexylmethylamine. After standing at 20° C. for 16 days, the product, the substituted hydantoamide of the following formula

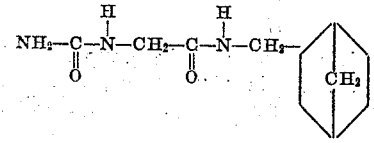

was separated in a yield of 8.7 g. (77%) and on recrystallization (water), melted at 209–211° C.

In a similar manner and using variants of $RCH_2NH_2$ the corresponding hydantoamides characterized in Table I were prepared.

Table I

HYDANTOAMIDES

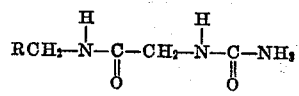

| No. | R | M.P., °C. | Formula | Analyses, Percent ||||||
|---|---|---|---|---|---|---|---|---|---|
| | | | | Carbon || Hydrogen || Nitrogen ||
| | | | | Calcd. | Found | Calcd. | Found | Calcd. | Found |
| 1 | $(CH_3)_2CHCH_2$— | 201–202 | $C_8H_{17}N_3O_2$ | 51.3 | 51.4 | 9.2 | 9.3 | 22.4 | 22.3 |
| 2 | $CH_3(CH_2)_3$— | 183–185 | $C_8H_{17}N_3O_2$ | 51.3 | 50.9 | 9.2 | 9.1 | 22.4 | 22.5 |
| 3 | $CH_3(CH_2)_5$— | 182–185 | $C_{10}H_{21}N_3O_2$ | 55.8 | 56.3 | 9.8 | 9.7 | 19.5 | 19.2 |
| 4 | $C_7H_{11}$—a | 209–211 | $C_{11}H_{19}N_3O_2$ | 58.6 | 58.3 | 8.5 | 8.1 | | |
| 5 | $C_4H_3O$—b | 175–177 | $C_8H_{11}N_3O_3$ | 48.7 | 48.8 | 5.6 | 5.7 | 21.3 | 20.6 |
| 6 | phenyl | 198–200 | $C_{10}H_{13}N_3O_2$ | 58.0 | 58.2 | 6.3 | 6.7 | 20.3 | 20.0 |
| 7 | p-chlorophenyl | 197–198 | $C_{10}H_{12}ClN_3O_2$ | 49.7 | 50.0 | 5.0 | 5.4 | 17.4 | 17.4 |
| 8 | benzyl | 176–177 | $C_{11}H_{15}N_3O_2$ | 59.7 | 60.0 | 6.8 | 6.6 | 19.0 | 18.6 |
| 9 | H | 181–183 | $C_4H_9N_3O_2$ | | | | | | |
| 10 | $HOCH_2$ | 133–134 | $C_5H_{11}N_3O_3$ | 37.3 | 37.3 | 6.9 | 6.6 | 26.1 | 26.0 |
| 11 | $CH_2=CH$— | 177–178 | $C_6H_{11}N_3O_2$ | 45.9 | 45.9 | 7.1 | 7.1 | 26.7 | 26.8 | a=2,5-endomethylenecyclohexyl.
b=2-furyl.

The compounds within the structural ambit of this invention show potent anti-inflammatory activity when evaluated by standard procedures.

The compounds of the invention are stable, white, somewhat water-soluble, crystalline solids which are conveniently prepared by the reaction of the appropriate amine $RNH_2$ with ethyl hydantoate in a lower alcohol.

The invention will be more fully described from the examples which follow. These examples are set forth by way of illustration only, and it will be understood that the invention is not to be construed as limited in spirit or in scope by the details contained therein, since many modifications in materials and methods will be apparent from this disclosure to those skilled in the art.

EXAMPLE 1

As typical of the reaction between the amine and ethyl hydantoate, the following example will suffice, since the other compounds are prepared in a similar manner, varying only the amine to obtain the appropriately substituted hydantoamide.

A solution of 7.3 g. (0.05 mole) of ethyl hydantoate in 35 ml. of hot methanol was cooled and treated with The compounds within the ambit of this invention show high anti-inflammatory responses, for example, with a lethal dose minimum in mice subcutaneous ($LD_{min.}$), there is obtained an anti-inflammatory effect in units per gram (outline of procedure given in Shapiro et al., J. Am. Pharm. Assoc., Sci. Ed., 46, 333 (1957)): compound 2 ($DL_{min.}$ over 1000 mg./kg.) has an activity of 7.5 units per gram; compound 4 ($LD_{min.}$ of 200 mg./kg.) shows activity of 10 units per gram; and compound 6 ($LD_{min.}$ of 100 mg./kg.) has an anti-inflammatory activity of 80 units per gram. For purposes of comparison, sodium salicylate has an $LD_{min.}$ of 400 mg./kg. and an anti-inflammatory activity of 2 units per gram.

In contrast to the compounds of this invention, the compounds made for purposes of comparison (compounds 9–11) show activity of no greater than 2 units per gram in any instance, and compound 9 shows no activity whatever.

The novel compounds of this invention can be combined with solid or liquid pharmaceutical carriers and formulated into the form of tablets, powder packets or capsules, or dissolved in suitable solvents for oral and parenteral administration for human or veterinary use.

We claim:
1. The compound

$$NH_2-\underset{\underset{O}{\|}}{C}-\underset{\underset{H}{|}}{N}-CH_2-\underset{\underset{O}{\|}}{C}-\underset{\underset{H}{|}}{N}-CH_2-R$$

wherein R is a member of the group consisting of hydrocarbon alkyl, said alkyl having a carbon content $C_4-C_7$, hydrocarbon cycloalkyl, said cycloalkyl having a carbon content $C_6-C_7$, phenyl, p-chlorophenyl, 2-furyl, and benzyl.

2. The compound of claim 1 wherein R is phenyl.
3. The compound of claim 1 wherein R is $$CH_3CH_2CH_2CH_2-$$

4. The compound of claim 1 wherein R is (2,5-endomethylene)cyclohexyl—.
5. The compound of claim 1 wherein R is benzyl.
6. The compound of claim 1 wherein R is $$CH_3(CH_2)_5-$$

No references cited.